(12) United States Patent
Tamaoka et al.

(10) Patent No.: US 9,366,263 B2
(45) Date of Patent: Jun. 14, 2016

(54) BEARING APPARATUS, MOTOR, AND BLOWER FAN

(71) Applicant: NIDEC CORPORATION, Kyoto (JP)

(72) Inventors: Takehito Tamaoka, Kyoto (JP); Kazuhiko Fukushima, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 335 days.

(21) Appl. No.: 13/921,637

(22) Filed: Jun. 19, 2013

(65) Prior Publication Data

US 2014/0199189 A1   Jul. 17, 2014

(30) Foreign Application Priority Data

Jan. 16, 2013  (JP) .................................. 2013-005174

(51) Int. Cl.
| | |
|---|---|
| F04D 25/06 | (2006.01) |
| H02K 7/08 | (2006.01) |
| F16C 17/10 | (2006.01) |
| F04D 29/056 | (2006.01) |
| F04D 29/063 | (2006.01) |
| F16C 33/10 | (2006.01) |
| F16C 33/74 | (2006.01) |
| H02K 5/167 | (2006.01) |
| F04D 29/08 | (2006.01) |

(52) U.S. Cl.
CPC ............ *F04D 25/062* (2013.01); *F04D 29/056* (2013.01); *F04D 29/063* (2013.01); *F16C 17/107* (2013.01); *F16C 33/107* (2013.01); *F16C 33/745* (2013.01); *H02K 5/1675* (2013.01); *F04D 29/083* (2013.01); *F16C 33/1075* (2013.01)

(58) Field of Classification Search
CPC ..... F04D 25/062; F04D 29/056; F04D 29/063; F16C 17/107; F16C 33/745; F16C 33/107; F16C 33/1075; H02K 5/1675
USPC ..................................... 310/90; 384/107, 100
See application file for complete search history.

(56) References Cited

U.S. PATENT DOCUMENTS 7,059,771 B2 *  6/2006  Gomyo ................. F16C 33/723
                                                                    384/100

(Continued)

FOREIGN PATENT DOCUMENTS

| JP | 11-132193 A | 5/1999 |
|---|---|---|
| JP | 11-252859 A | 9/1999 |

*Primary Examiner* — Peter J Bertheaud
*Assistant Examiner* — Dominick L Plakkoottam
(74) *Attorney, Agent, or Firm* — Westerman, Hattori, Daniels & Adrian, LLP (57) ABSTRACT

A bearing apparatus according to a preferred embodiment of the present invention includes a bearing portion having a bottom and being substantially cylindrical; a shaft inserted in the bearing portion, and arranged to rotate about a central axis relative to the bearing portion; a bearing opposing portion defined in one piece, arranged above the bearing portion, and arranged to hold an upper end portion of the shaft while covering an outer circumferential surface upper portion and an upper end surface of the shaft; and a cylindrical seal portion arranged to extend downward from the bearing opposing portion. An inner circumferential surface of the cylindrical seal portion and an outer circumferential surface of the bearing portion are arranged to together define a seal gap therebetween, the seal gap including a seal portion having a surface of a lubricating oil defined therein.

18 Claims, 9 Drawing Sheets

(56) References Cited

U.S. PATENT DOCUMENTS

| | | | | |
|---|---|---|---|---|
| 2007/0025652 A1* | 2/2007 | Satoji | F16C 17/107 384/100 |
| 2007/0257571 A1* | 11/2007 | Hong | F04D 29/056 310/67 R |
| 2007/0274617 A1* | 11/2007 | Shibahara | F16C 17/107 384/107 |
| 2009/0297076 A1* | 12/2009 | Murakami | F16C 35/02 384/100 |
| 2011/0101807 A1* | 5/2011 | Yu | F16C 17/107 310/90 |
| 2012/0235526 A1* | 9/2012 | Wu | H02K 5/1675 310/90 |
| 2013/0004114 A1* | 1/2013 | Hasegawa | F04D 17/16 384/607 |

\* cited by examiner

BEARING APPARATUS, MOTOR, AND BLOWER FAN

BACKGROUND OF THE INVENTION

1. Field of the Invention

The present invention relates to bearing apparatuses. In particular, the present invention relates to bearing apparatuses installed in motors and blower fans.

2. Description of the Related Art

Small and high-performance electronic devices, such as notebook PCs, produce a large amount of heat at CPUs and the like inside cases thereof. This makes it important to take measures against the heat. One common measure against the heat is to install blower fans inside the cases to discharge the heat.

JP-A 11-252859, for example, discloses a heat sink apparatus arranged to be installed on an electronic device, such as a personal computer. An electric motor which uses a dynamic pressure fluid bearing is used in the heat sink apparatus. A shaft 9 which extends from a fan 8 of the heat sink apparatus is rotatably inserted in a sleeve 6. An end surface of the shaft 9 on a side opposite to the fan 8 is arranged to be a spherical surface, and is arranged to be in contact with a thruster 5 to define a thrust bearing 18. Dynamic pressure generating grooves 13 are defined in an inner circumferential surface of the sleeve 6. An oil 14 is fed into the dynamic pressure generating grooves 13 to define a radial bearing 17.

In the heat sink apparatus disclosed in JP-A 11-252859, the shaft 9 is fixed to the fan 8, and an upper end surface of the shaft 9 is exposed from an upper surface of the fan 8. Therefore, the oil may leak into a gap between the fan 8 and an upper end portion of the shaft 9 through capillary action, and then leak above the fan 6.

SUMMARY OF THE INVENTION

A bearing apparatus according to a preferred embodiment of the present invention includes a bearing portion having a bottom and being substantially cylindrical; a shaft inserted in the bearing portion, and arranged to rotate about a central axis relative to the bearing portion; a bearing opposing portion defined in one piece, arranged above the bearing portion, and arranged to hold an upper end portion of the shaft while covering an outer circumferential surface upper portion and an upper end surface of the shaft; and a cylindrical seal portion arranged to extend downward from the bearing opposing portion. An inner circumferential surface of the cylindrical seal portion and an outer circumferential surface of the bearing portion are arranged to together define a seal gap therebetween, the seal gap including a seal portion having a surface of a lubricating oil defined therein. An inner circumferential surface of the bearing portion and an outer circumferential surface of the shaft are arranged to together define a radial gap therebetween, the radial gap including a radial dynamic pressure bearing portion arranged to radially support the shaft. The lubricating oil is arranged in a gap defined between a lower surface of the bearing opposing portion and an upper surface of the bearing portion.

The present invention is able to prevent the lubricating oil from leaking above the bearing apparatus through an area of connection between the shaft, and the bearing opposing portion.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
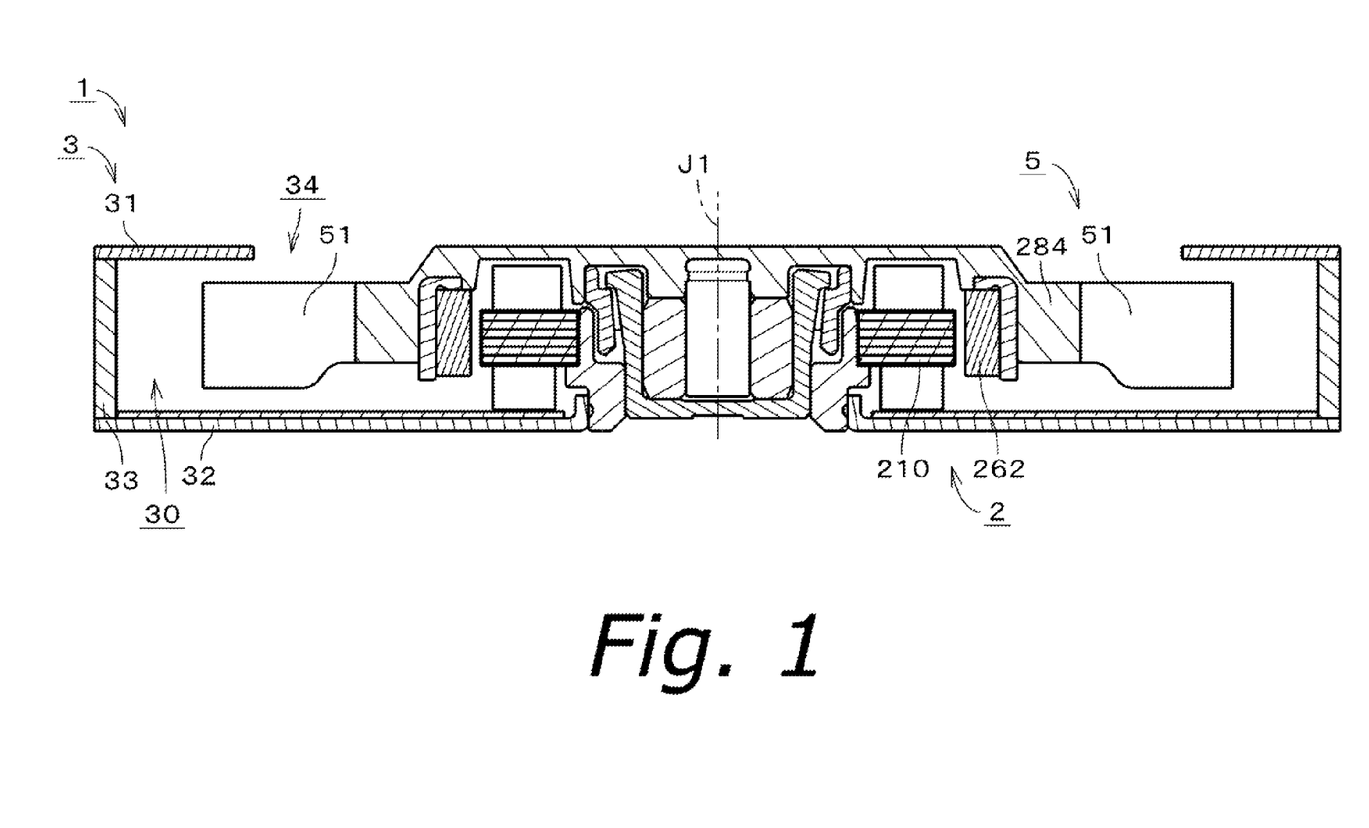
FIG. 1 is a cross-sectional view of a blower fan according to a first preferred embodiment of the present invention.

It is assumed herein that an upper side and a lower side in an axial direction parallel to a central axis of a blower fan in FIG. 1 are referred to simply as an upper side and a lower side, respectively. Note that a vertical direction assumed herein may not necessarily correspond with a vertical direction of the blower fan when the blower fan is actually installed in a device. It is also assumed herein that a circumferential direction about the central axis is referred to simply by the terra "circumferential direction", "circumferential", or "circumferentially", and that radial directions centered on the central axis are referred to simply by the term "radial direction", "radial", or "radially".

FIG. 1 is a cross-sectional view of a blower fan 1 according to a first preferred embodiment of the present invention. The blower fan 1 is a centrifugal fan. The blower fan 1 is, for example, installed in a notebook personal computer (hereinafter referred to as a "notebook PC"), and is used to cool devices inside a case of the notebook PC.

The blower fan 1 includes a motor portion 2, a housing 3, and an impeller 5. The impeller 5 is centered on a central axis J1 extending in a vertical direction. The motor portion 2 is arranged to rotate the impeller 5 about, the central axis J1. The housing 3 is arranged to accommodate the motor portion 2 and the impeller 5.

The housing 3 includes an upper plate portion 31, a lower plate portion 32, and a side wall portion 33. The upper plate portion 31 is arranged to cover an upper side of the impeller 5. The lower plate portion 32 is arranged to cover a lower side of the impeller 5. The motor portion 2 is fixed to the lower plate portion 32. The side wall portion 33 is arranged to cover a side of the impeller 5. The upper plate portion 31, the side wall portion 33, and the lower plate portion 32 are arranged to together define an air channel portion 30 arranged to surround the impeller 5.

Each of the upper and lower plate portions 31 and 32 is made of a metal such as an aluminum alloy or stainless steel, and is defined in the shape of a thin plate. The side wall portion 33 is made of an aluminum alloy, and is molded by die casting. Alternatively, the side wall portion 33 may be molded of a resin. A lower end portion of the side wall portion 33 and an edge portion of the lower plate portion 32 are fastened to each other by screws or the like. The upper plate portion 31 is fixed to an upper end portion of the side wall portion 33 by crimping or the like. The upper plate portion 31 includes an air inlet 34. The air inlet 34 is arranged above the impeller 5. The upper plate portion 31, the side wall portion 33, and the lower plate portion 32 are arranged to together define an air outlet to a side of the impeller 5. Note that the lower plate portion 32 is a portion of a stationary portion 21, which will be described below.

Figure 2:
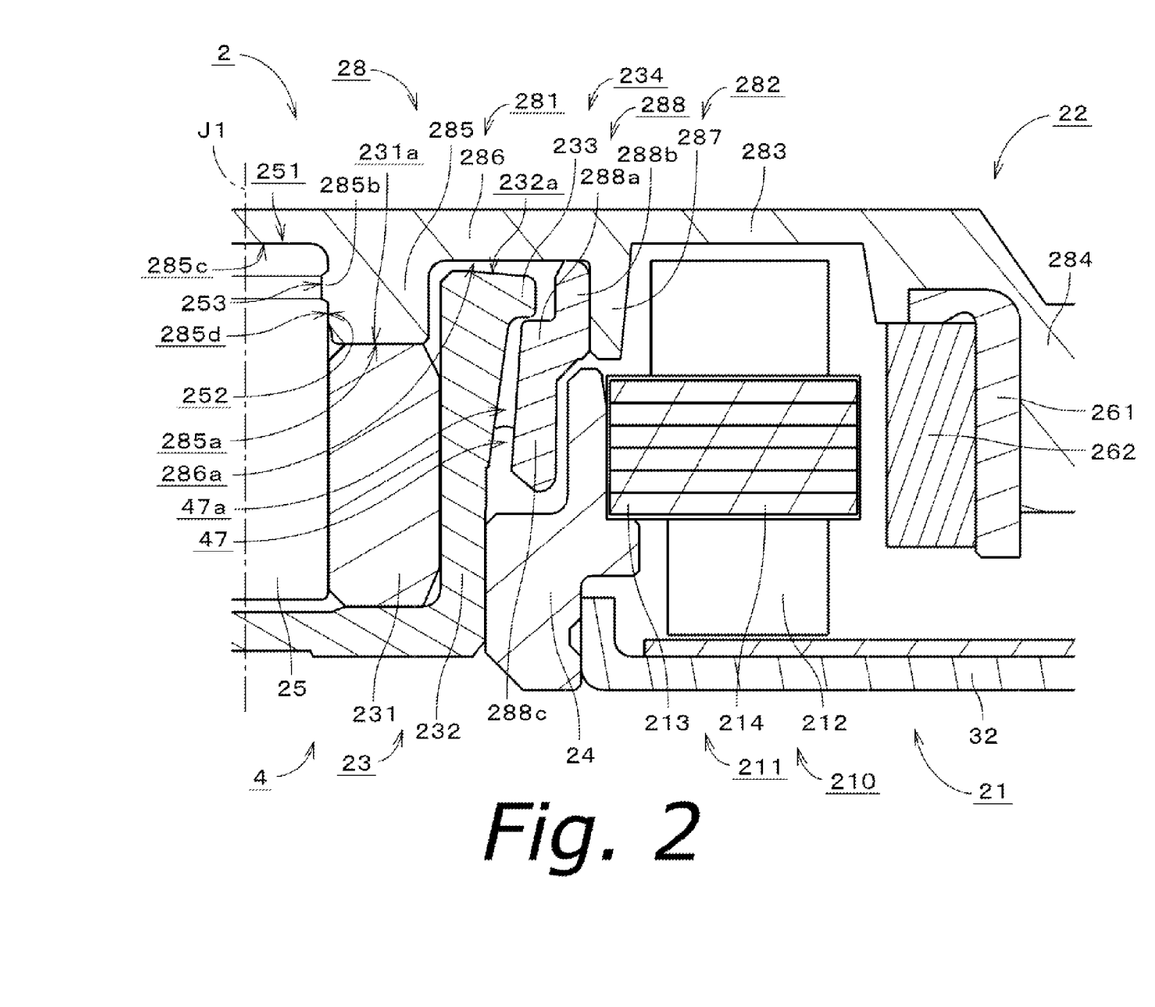
FIG. 2 is a cross-sectional view of a motor portion and its vicinity according to the first preferred embodiment.

FIG. 2 is a cross-sectional view of the motor portion 2 and its vicinity. The motor portion 2 is of an outer-rotor type. The motor portion 2 includes the stationary portion 21, which is a stationary assembly, and a rotating portion 22, which is a rotating assembly. Since a bearing mechanism 4, which is a bearing apparatus, is defined by a portion of the stationary portion 21 and a portion of the rotating portion 22 as described below, the motor portion 2 can be considered to include the stationary portion 21, the bearing mechanism 4, and the rotating portion 22 when the bearing mechanism. 4 is regarded as a component of the motor portion 2. The rotating portion 22 is supported by the bearing mechanism 4 to be rotatable about the central axis J1 with respect to the stationary portion 21.

The stationary portion 21 includes a stator 210, a bearing portion 23, a bushing 24, and the lower plate portion 32. The bearing portion 23 has a bottom and is substantially cylindrical and centered on the central axis J1. The bearing portion 23 includes a sleeve 231 and a bearing housing 232. The sleeve 231 is substantially cylindrical and centered on the central axis J1. The sleeve 231 is a metallic sintered body. The sleeve 231 is impregnated with a lubricating oil.

The bearing housing 232 has a bottom and is substantially cylindrical and centered on the central axis J1. The bearing housing 232 is arranged to cover an outer circumferential surface and a lower surface of the sleeve 231. The sleeve 231 is fixed to an inner circumferential surface of the bearing housing 232 through an adhesive. The bearing housing 232 is made of a metal. The sleeve 231 may be fixed to the inner circumferential surface of the bearing housing 232 through press fit, for example. Mote that both adhesion and press fit may be used to fix the sleeve 231 and the bearing housing 232 to each other. The bearing housing 232 may be made of another material, such as a resin.

The sleeve 231 is an inner circumferential bearing portion arranged to define an inner circumferential portion of the bearing portion 23. The bearing housing 232 is an outer circumferential bearing portion arranged to define an outer circumferential portion of the bearing portion 23, and arranged radially outside the sleeve 231 and to be in contact with the outer circumferential surface of the sleeve 231. An upper surface 231a of the sleeve 231 is preferably arranged at a level lower than that of an upper surface 232a of the bearing housing 232.

The bushing 24 is a substantially cylindrical member centered on the central axis J1. The bushing 24 is preferably made of a resin. An inner circumferential surface of the bushing 24 is fixed to a lower area of an outer circumferential surface of the bearing housing 232 through adhesion or press fit. Mote that both adhesion and press fit may be used to fix the bearing housing 232 and the bushing 24 to each other. An outer circumferential surface of the bushing 24 is fixed to a hole portion defined in the lower plate portion 32. The bushing 24 is a bearing holding portion arranged to hold the bearing portion 23.

The stator 210 is a substantially annular member centered on the central axis J1. The stator 210 is fitted to the outer circumferential surface of the bushing 24. The stator 210 includes a stator core 211 and a plurality of coils 212. The stator core 211 is defined by laminated silicon steel sheets, each of which is in the shape of a thin plate. The stator core 211 includes a substantially annular core back 213 and a plurality of teeth 214 arranged to project radially outward from the core back 213. An inner circumferential surface of the core back 213 is fixed to the outer circumferential surface of the bushing 24 through adhesion or press fit. Note that, both adhesion and press fit may be used to fix the core back 213 and the bushing 24 to each other. Each of the coils 212 is defined by a conducting wire wound around a separate one of the teeth 214.

An upper end of the stator 210 is preferably arranged at a level higher than that of the upper surface 231a of the sleeve 231. A lower end of the stator 210 is preferably arranged at a level lower than that of the lower surface of the sleeve 231. The upper end and the lower end of the stator 210 correspond to an upper end and a lower end, respectively, of each coil 212.

In the motor portion 2, the bushing 24 is fixed to the lower plate portion 32 as described above, whereby both the stator 210 and the bearing portion 23 are indirectly fixed to the lower plate portion 32, which corresponds to a base portion.

The rotating portion 22 includes a shaft. 25, a yoke 261, a rotor magnet 262, and a cup 28. The shaft 25 is substantially columnar and centered on the central axis J1. The shaft 25 is inserted in the sleeve 231 of the bearing portion 23. In other words, the sleeve 231 is arranged to surround the shaft 25 from radially outside. The shaft 25 is arranged to rotate about, the central axis J1 relative to the bearing portion 23. The shaft 25 is preferably made of a metal.

The cup 28 is substantially in the shape of a covered cylinder and centered on the central axis J1, and is arranged to open downwardly. The cup 28 includes a bearing opposing portion 281, a cylindrical seal portion 282, a cover portion 283, and a cylindrical magnet, holding portion 284.

The bearing opposing portion 281 is arranged above the bearing portion 23. The bearing opposing portion 281 is defined in one piece, and is made of a resin. The bearing opposing portion 281 includes a shaft holding portion 285 and an annular portion 286. The shaft holding portion 285 is substantially in the shape of a covered cylinder and centered on the central axis J1. The shaft holding portion 285 is arranged to hold an upper end portion of the shaft 25 while covering an upper end surface 251 of the shaft 25 and an upper portion 252 of an outer circumferential surface of the shaft 25. The upper portion 252 of the outer circumferential surface of the shaft 25 will be hereinafter referred to as an "outer circumferential surface upper portion" 252 as appropriate. An inner bottom surface 285c of the shaft holding portion 285 is arranged to be in contact with the upper end surface 252 of the shaft 25. An inner circumferential surface 285d of the shaft holding portion 285 is preferably arranged to be in contact with the outer circumferential surface upper portion 252 of the shaft 25 over an entire circumferential extent thereof.

The shaft 25 and the bearing opposing portion 281 are fixed to each other by an insert molding process. The inner circumferential surface 285d of the shaft holding portion 285 of the bearing opposing portion 281 includes an annular raised portion 285b arranged to project radially inward. The outer circumferential surface upper portion 252 of the shaft 25 includes an annular recessed portion 253 arranged to be recessed radially inward. The recessed portion 253 and the raised portion 285b are fitted to each other.

The shape of each of the raised portion 285b and the recessed portion 253 may be modified in various manners. For example, the raised portion 285b may be replaced with a plurality of projections arranged in a circumferential direction, and the recessed portion 253 may be replaced with a plurality of recesses to which the projections are fitted. Alternatively, the inner circumferential surface 285d of the shaft holding portion 285 may be arranged to include a recessed portion(s), with the outer circumferential surface upper portion 252 of the shaft 25 including a raised portion(s) arranged to be fitted to the recessed portion is). Furthermore, both the inner circumferential surface 285d of the shaft holding portion 285 and the outer circumferential surface upper portion 252 of the shaft 25 may be arranged to include knurled structures, which are defined by projections and recesses fitted to one another. The recessed portion (s) or the raised portion(s) defined in the inner circumferential surface 285d of the shaft holding portion 285 is preferably arranged on an upper side of a vertical middle of the inner circumferential surface 285d of the shaft, holding portion 285.

The annular portion 286 is substantially annular, and is arranged to extend radially outward from the shaft holding portion 285. The annular portion 286 is arranged to be continuous with an upper end portion of the shaft holding portion 285. A lower end surface 285a of the shaft, holding portion 285 is preferably arranged at a level lower than that, of a lower surface 286a of the annular portion 286. In other words, the shaft holding portion 285 is arranged to project downward below the annular portion 286. Moreover, the lower end surface 285a of the shaft holding portion 285 is preferably arranged at a level lower than that of the upper end of the stator 210. The radial position of a boundary between the shaft-holding portion 285 and the annular portion 286 is arranged at that of a shoulder portion of a lower surface of the bearing opposing portion 281 where the lower surface of the hearing opposing portion 281 significantly changes in vertical position. An upper surface of the shaft holding portion 285 and an upper surface of the annular portion 286 are arranged at the same vertical position.

The lower end surface 285a of the shaft holding portion 285 is arranged opposite to the upper surface 231a of the sleeve 231 in the vertical direction. The shaft, holding portion 285 is arranged radially inside a side wall portion of the bearing housing 232. An outer circumferential surface of the shaft bedding portion 285 is arranged radially opposite an upper portion of the inner circumferential surface of the bearing housing 232. The lower end surface 285a of the shaft holding portion 285 is arranged between the upper surface 231a of the sleeve 231 and the upper surface 232a of the bearing housing 232 in the vertical direction. The lower surface 286a of the annular portion 286 is arranged opposite to the upper surface 232a of the bearing housing 232 in the vertical direction. The radial position of the aforementioned boundary between the shaft holding portion 285 and the annular portion 286 is arranged at substantially the same radial position as that of the outer circumferential surface of the sleeve 231. In more detail, the boundary between the shaft holding portion 285 and the annular portion 286 is arranged slightly radially inward of the outer circumferential surface of the sleeve 231.

The cylindrical seal portion 282 is substantially cylindrical, and is arranged to extend downward from the annular portion 286 of the bearing opposing portion 281. The cylindrical seal portion 282 is arranged to be continuous with an outer edge portion of the annular portion 286, and is arranged radially outward of the shaft holding portion 285. The cylindrical seal portion 282 is arranged radially outward of the bearing portion 23 and radially inward of the stator 210. An inner circumferential surface of the cylindrical seal portion 282 is arranged radially opposite an upper portion of an outer circumferential surface of the bearing portion 23.

The cylindrical seal portion 282 includes a seal base portion 287 and a seal bushing 288. The seal base portion 287 is substantially cylindrical, and is arranged to extend downward from the outer edge portion of the annular portion 286 of the bearing opposing portion 281. The seal base portion 287 is defined integrally with the bearing opposing portion 281, and is made of the resin.

The seal bushing 288 is substantially cylindrical and centered on the central axis J1, and is defined by a member separate from the seal base portion 287. The seal bushing 288 is preferably made of a metal or a resin. The seal bushing 288 is fixed to an inner circumferential surface of the seal base portion 287. A seal gap 47 is defined between an inner circumferential surface of the seal bushing 288 and the outer circumferential surface of the bearing housing 232. A seal portion 47a having a surface of the lubricating oil defined therein is defined in the seal gap 47.

The bearing housing 232 includes an annular flange portion 233 arranged to project radially outward toward the cylindrical seal portion 282. The flange portion 233 is defined in an upper end portion of the bearing housing 232. The flange portion 233 is arranged at a level higher than that of the upper surface 231a of the sleeve 232.

The seal bushing 288 includes a substantially annular flange opposing portion 288a. The flange opposing portion 288a is arranged below the flange portion 233 and opposite to the flange portion 233 in the vertical direction. The seal bushing 288 further includes a substantially cylindrical "seal bushing upper portion" 288b and a substantially cylindrical "seal bushing lower portion" 288c.

The seal bushing upper portion 288b is arranged to extend upward from an outer circumferential portion of the flange opposing portion 288a. An upper end of the seal bushing 288 is arranged to be in contact with the lower surface 286a of the annular portion 286. An inner circumferential surface of the seal bushing upper portion 288b is arranged radially opposite an outer circumferential surface of the flange portion 233. An outer circumferential surface of the seal bushing upper portion 288b is fixed to the inner circumferential surface of the seal base portion 287 together with an outer circumferential surface of the flange opposing portion 288a. The seal bushing lower portion 288c is arranged to extend downward from an inner circumferential portion of the flange opposing portion 288a. An inner circumferential surface of the seal bushing lower portion 288c is arranged radially opposite the outer circumferential surface of the bearing housing 232 below the flange portion 233. The surface of the lubricating oil is defined between the inner circumferential surface of the seal bushing lower portion 288c and the outer circumferential surface of the bearing housing 232.

When the bearing mechanism 4 is constructed, the flange portion 233 is arranged radially inside the seal base portion 287, and the seal bushing 288 is thereafter fixed to the inner circumferential surface of the seal base portion 287, so that a coming-off preventing portion 234 is defined by the flange portion 233 and the flange opposing portion 288a. The coming-off preventing portion 234 serves to prevent the bearing portion 23 from being detached from the cup 28, and thereby prevent the shaft 25 from corning off the bearing portion 23.

The seal bushing 288 is fixed to the inner circumferential surface of the seal base portion 287 preferably by being press fitted radially inside the seal base portion 287. Both the outer circumferential surface of the seal bushing upper portion 288b and the outer circumferential surface of the flange opposing portion 288a are arranged to be in contact with the inner circumferential surface of the steal fosse portion 287 as a result of the seal bushing 288 being press fitted to the seal base portion 287. Mote that the press fitting of the seal bushing 288 may foe performed, for example, after an adhesive is applied to the inner circumferential surface of the seal base portion 287. Also note that, the seal bushing 288 may be adhered to the inner circumferential surface of the seal base portion 287 through the adhesive without being press fitted to the seal base portion 287.

The cover portion 283 is substantially annular, and is arranged to extend radially outward from the outer edge portion of the annular portion 286 of the bearing opposing portion 281. The cover portion 283 is arranged above the stator 210. The cylindrical magnet holding portion 284 is substantially cylindrical, and is arranged to extend downward from an outer edge portion of the cover portion 283. The cylindrical magnet holding portion 284 is arranged radially outside the stator 210. Both the cover portion 283 and the cylindrical magnet holding portion 284 are defined integrally with the bearing opposing portion 261, and are made of the resin.

The yoke 261 is substantially cylindrical and centered on the central axis J1. The yoke 261 is fixed to an inner circumferential surface of the cylindrical magnet holding portion 284. The rotor magnet 262 is substantially cylindrical and centered on the central axis J1, and is fixed to an inner circumferential surface of the yoke 261. In other words, the rotor magnet 262 is indirectly fixed to the inner circumferential surface of the cylindrical magnet holding portion 284 through the yoke 261. The rotor magnet 262 is arranged radially outside the stator 210.

Referring to FIG. 1, the impeller 5 includes a plurality of blades 51. The blades 51 are arranged radially outside the cylindrical magnet holding portion 284 and in the shape of a ring with the central axis J1 as a center. The blades 51 are directly fixed to an outer circumferential surface of the cylindrical magnet, holding portion 284. Note that the blades 51 may be indirectly fixed to the outer circumferential surface of the cylindrical magnet holding portion 284 through another member such as a blade support portion.

Figure 3:
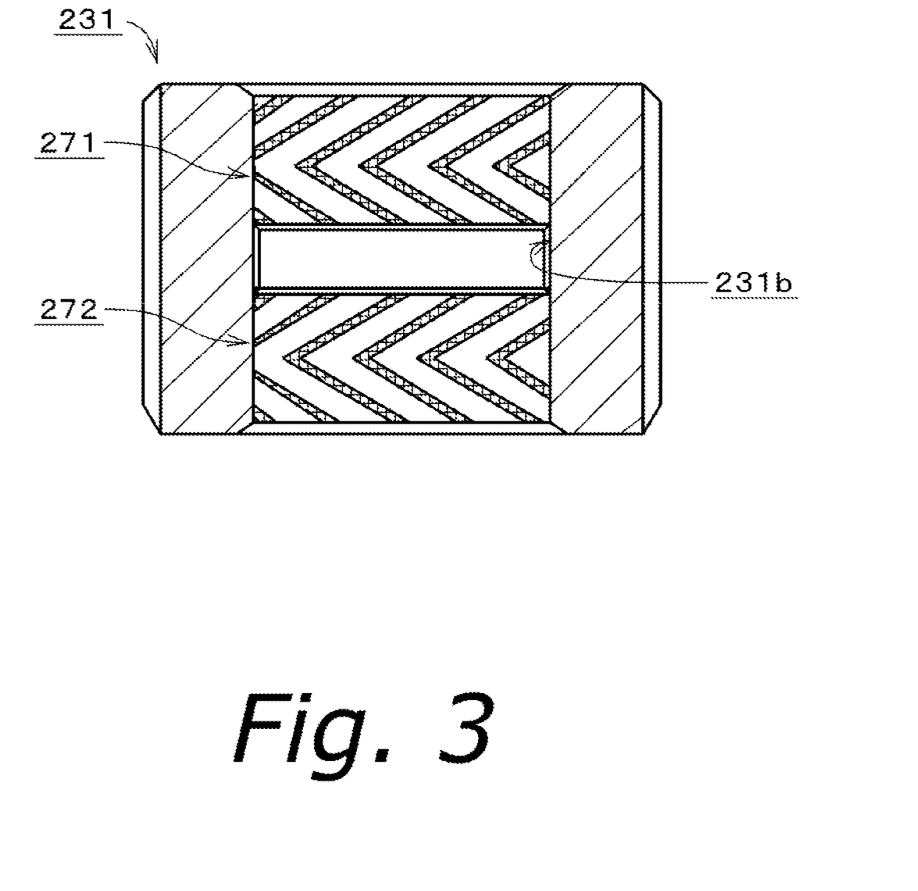
FIG. 3 is a cross-sectional view of a sleeve according to the first preferred embodiment.
Figure 4:
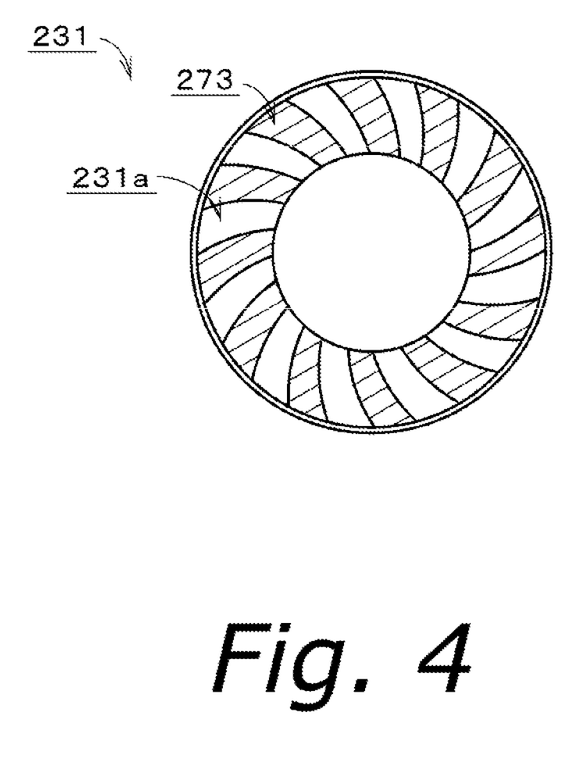
FIG. 4 is a plan view of the sleeve.

FIG. 3 is a cross-sectional view of the sleeve 231. An upper portion and a lower portion of an inner circumferential surface 231b of the sleeve 231 include a first radial dynamic pressure groove array 271 and a second radial dynamic pressure groove array 272, respectively, each of which is made up of a plurality of grooves arranged in a herringbone pattern. FIG. 4 is a plan view of the sleeve 231. The upper surface 231a of the sleeve 231 includes a thrust dynamic pressure groove array 273 made up of a plurality of grooves arranged in a spiral pattern. Note that each of the first and second radial dynamic pressure groove arrays 271 and 272 may be defined in the outer circumferential surface of the shaft 25. Also note that the thrust dynamic pressure groove array 273 may be defined in the lower end surface 285a of the shaft holding portion 285. Also note that the thrust dynamic pressure groove array 273 may be made up of a collection of grooves arranged in the herringbone pattern.

Figure 5:
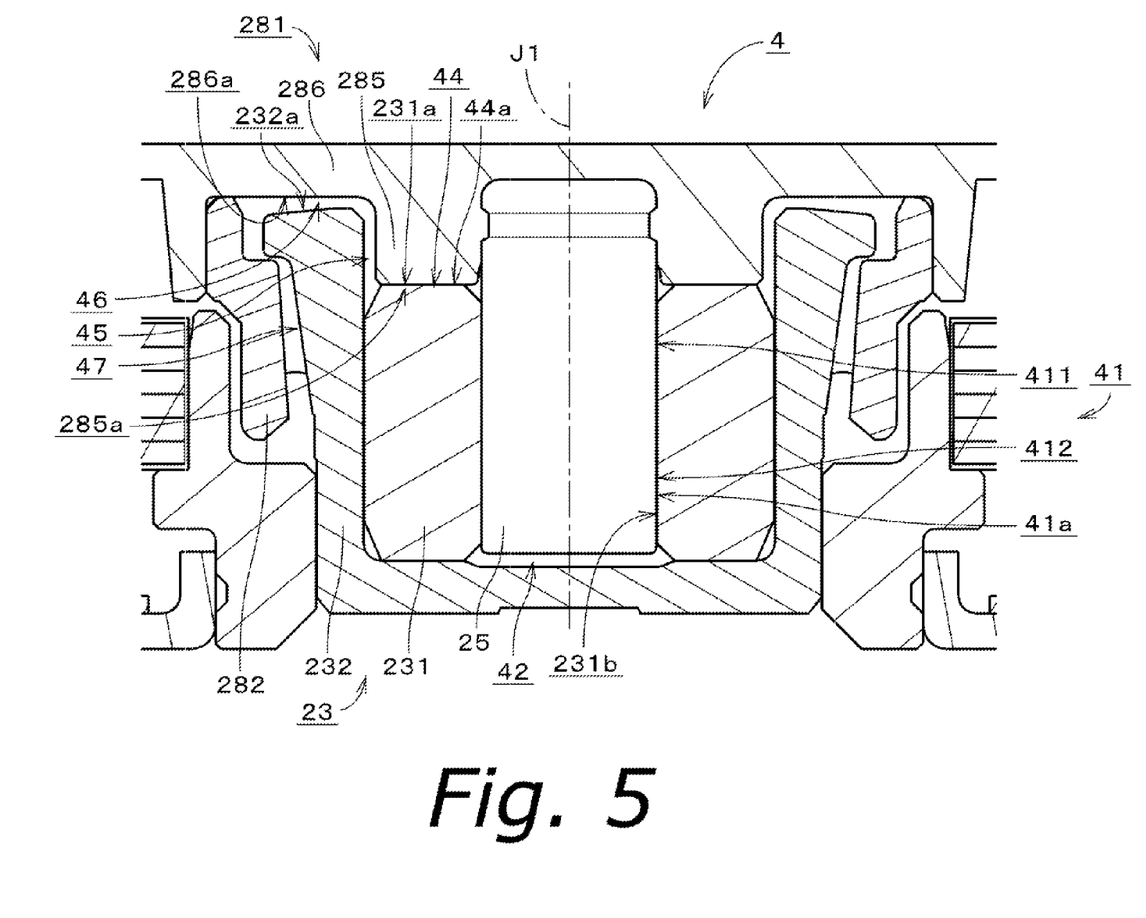
FIG. 5 is a cross-sectional view of a bearing portion and its vicinity according to the first preferred embodiment.

FIG. 5 is a cross-sectional view of the bearing portion 23 and its vicinity. A lower gap 42 is defined between a lower end surface of the shaft 25 and an inner bottom surface of the bearing housing 232. In addition, a radial gap 41 is defined between the outer circumferential surface of the shaft 25 and the inner circumferential surface 231b of the sleeve 231 of the bearing portion 23. The lower gap 42 is arranged to be continuous with a lower end portion of the radial gap 41. The radial gap 41 includes a first radial gap 411 and a second radial gap 412 arranged below the first radial gap.

The first radial gap 411 is defined between the outer circumferential surface of the shaft 25 and a portion of the inner circumferential surface 231b of the sleeve 231 in which the first radial dynamic pressure groove array 271 illustrated in FIG. 3 is defined. The lubricating oil is arranged in the first radial gap 411. Meanwhile, the second radial gap 412 is defined between the outer circumferential surface of the shaft and a portion of the inner circumferential surface 231b of the sleeve 231 in which the second radial dynamic pressure groove array 272 illustrated in FIG. 3 is defined. The lubricating oil is arranged in the second radial gap 412 as well. The first and second radial gaps 411 and 412 are arranged to together define a radial dynamic pressure bearing portion 41a to generate a fluid dynamic pressure in the lubricating oil. The shaft 25 is radially supported by the radial dynamic pressure bearing portion 41a.

A thrust gap 44 is defined between the upper surface 231a of the sleeve 231 and the lower end surface 285a of the shaft holding portion 285 of the bearing opposing portion 282. The thrust gap 44 is arranged to extend radially outward from an upper end portion of the radial gap 41. The lubricating oil is arranged in the thrust gap 44. The thrust gap 44 is arranged to define a thrust dynamic pressure bearing portion 44a arranged to generate a fluid dynamic pressure in the lubricating oil. The bearing opposing portion 281 is axially supported by the thrust dynamic pressure bearing portion 44a.

An upper vertical gap 45 extending in the vertical direction is defined between the outer circumferential surface of the shaft holding portion 285 and the inner circumferential surface of the bearing housing 232. An upper horizontal gap 46 extending radially is defined between the upper surface 232a of the bearing housing 232 and the lower surface 286a of the annular portion 286. The upper vertical gap 45 is arranged to extend upward from an outer circumferential edge of the thrust gap 44. The upper horizontal gap 46 is arranged to extend radially outward from an upper end portion of the upper vertical gap 45. The seal gap 47 described above is arranged to extend downward from an outer circumferential edge of the upper horizontal gap 46. The lubricating oil is arranged in all of the upper vertical gap 45, the upper horizontal gap 46, and the seal gap 47.

In the motor portion 2, the seal gap 47, the upper horizontal gap 46, the upper vertical gap 45, the thrust gap 44, the radial gap 41, and the lower gap 42 are arranged to together define a single continuous bladder structure, and the lubricating oil is arranged continuously in this bladder structure. Within the bladder structure, the surface of the lubricating oil is defined only in the seal gap 47, which is located between the inner circumferential surface of the cylindrical seal portion 282 and the outer circumferential surface of the bearing portion 23. The bladder structure contributes to easily preventing a leakage of the lubricating oil.

The bearing mechanism 4 of the motor portion 2 includes the bearing portion 23, the shaft 25, the bearing opposing portion 281, the cylindrical seal portion 282, and the aforementioned lubricating oil. In the bearing mechanism 4, the shaft 25, the bearing opposing portion 281, and the cylindrical seal portion 282 are arranged to rotate about the central axis J1 relative to the bearing portion 23 through the lubricating oil.

In the motor portion 2 illustrated in FIG. 1, a current is supplied to the stator 210 to produce a torque centered on the central axis J1 between the rotor magnet 262 and the stator 210. This causes the blades 51 of the impeller 5 to rotate about the central axis J1 together with the rotating portion 22. Rotation of the impeller 5 caused by the motor portion 2 causes an air to be drawn into the housing 3 through the air inlet 34 and sent out through the air outlet.

As described above, in the bearing mechanism 4 of the blower fan 1, the bearing opposing portion 231 is arranged to hold the upper end portion of the shaft 25 while covering both the upper end surface 251 and the outer circumferential surface upper portion 252 of the shaft 25. In addition, the lubricating oil is always arranged in both the gap between the upper surface 231a of the sleeve 231 and the lower end surface 285a of the shaft, holding portion 285 of the bearing opposing portion 281 and the gap between the outer circumferential surface of the shaft 25 and the inner circumferential surface 231b of the sleeve 231 of the bearing portion 23. There is accordingly a possibility that the lubricating oil will penetrate into a gap between the outer circumferential surface upper portion 252 of the shaft 25 and the inner circumferential surface 285d of the shaft holding portion 285 of the bearing opposing portion 281. However, even if the lubricating oil penetrates into the gap as described above, the lubricating oil is prevented from leaking above the bearing mechanism 4.

As described above, the bearing opposing portion 281 includes the shaft holding portion 285 and the annular portion 286, and the lower end surface 285a of the shaft holding portion 285 is arranged at a level lower than that of the lower surface 286a of the annular portion 286. This contributes to securing a sufficient length of an area over which the shaft holding portion 285 and the shaft 25 are fastened to each other while reducing the vertical thickness of the annular portion 286. As a result, an increase in the strength with which the shaft 25 is held by the bearing opposing portion 281 and a reduction in the thickness of each of the motor portion 2 and the blower fan 1 are achieved at the same time.

In the hearing mechanism 4, the recessed portion (s) or the raised portion(s) is defined in the inner circumferential surface 285d of the shaft holding portion 285, while the raised portion(s) or the recessed portion(s) to be fitted to the recessed portion(s) or the raised portion(s) defined in the inner circumferential surface 285d of the shaft holding portion 285 is defined in the outer circumferential surface upper portion 252 of the shaft 25. An additional increase in the strength with which the shaft 25 is held by the bearing opposing portion 281 is thereby achieved.

In the case where the bearing opposing portion 281 is expanded by an increase in temperature or the like, an upper portion of the shaft holding portion 285, which is close to the annular portion 286, tends to be expanded less easily than a lower portion of the shaft holding portion 285, which is away from the annular portion 286. That is, in the case where the bearing opposing portion 281 undergoes thermal expansion, the upper portion of the shaft holding portion 285 tends to be radially separated from the shaft 25 less easily than the lower portion of the shaft holding portion 285. As described above, the recessed portion(s) or the raised portion(s) defined in the inner circumferential surface 285d of the shaft holding portion 285 is arranged on the upper side of the vertical middle of the inner circumferential surface 285d of the shaft holding portion 285. This reduces the likelihood that the recessed portion(s) or the raised portion(s) defined in the shaft holding portion 285 will be separated from the raised portion(s) or the recessed portion(s) defined in the shaft 25 even if the bearing opposing portion 281 undergoes thermal expansion. This in turn reduces the likelihood that the strength with which the shaft 25 is held by the bearing opposing portion 281 will be decreased with an increase in temperature of the blower fan 1.

The bearing portion 23 includes the sleeve 231 and the bearing housing 232, the upper surface 231a of the sleeve 231 is arranged at a level lower than that of the upper surface 232a of the bearing housing 232, and the lower end surface 285a of the shaft holding portion 265 is arranged between the upper surface 231a of the sleeve 231 and the upper surface 232a of the bearing housing 232 in the vertical direction. This enables the seal portion 47a, in which the surface of the lubricating oil is defined, to be arranged upward while securing a sufficient length of the area over which the shaft holding portion 285 and the shaft 25 are fastened to each other. This increases the vertical extent of a portion of the outer circumferential surface of the bearing portion 23 which is below a region of the outer circumferential surface of the bearing portion 23 which defines the seal portion 47a. This results in an increase in the length of an area over which the above portion of the outer circumferential surface of the bearing portion 23 and the bushing 24 are fastened to each other, leading to an increase in strength with which the bearing portion 23 and the bushing 24 are fastened to each other.

Note that the bearing portion 23 may be defined in one piece, instead of being made up of the bearing housing 232 and the sleeve 231 inserted in the bearing housing 232. In this case, a substantially cylindrical inner circumferential bearing portion, which is a radially inner portion of the bearing portion 23, is arranged to surround the shaft 25 from radially outside, and is arranged opposite to the lower end surface 285a of the shaft holding portion 285 in the vertical direction. In addition, an outer circumferential bearing portion, which has a bottom and is substantially cylindrical and a side wall portion of which is arranged radially outward of the inner circumferential bearing portion, is arranged opposite to the lower surface 286a of the annular portion 286 in the vertical direction. Moreover, an upper surface of the inner circumferential bearing portion is arranged at a level lower than that of an upper surface of the outer circumferential bearing portion, and the lower end surface 285a of the shaft holding portion 285 is arranged between the upper surface of the inner circumferential bearing portion and the upper surface of the outer circumferential bearing portion in the vertical direction. The above arrangement similarly enables the seal portion 47a to be arranged upward while securing a sufficient length of the area over which the shaft holding portion 285 and the shaft 25 are fastened to each other. This results in an increase in the strength with which the bearing portion 23 and the bushing 24 are fastened to each other.

However, in the case where the inner circumferential bearing portion and the outer circumferential bearing portion are, respectively, the sleeve 231 and the bearing housing 232 separate from the sleeve 231, the structure of the bearing portion 23, that is, the upper surface of the outer circumferential bearing portion being arranged at a level higher than that of the upper surface of the inner circumferential bearing portion, is easily realized. In other words, a difference in vertical position between the upper surface of the inner circumferential bearing portion and the upper surface of the outer circumferential bearing portion is easily realized. Moreover, an improvement in flexibility in choosing the material of the inner circumferential bearing portion is achieved. Furthermore, in the case where a sintered body is used as the inner circumferential bearing portion, an increase in the amount of the lubricating oil held in the bearing portion 23 is easily achieved.

As described above, the cylindrical seal portion 282 includes the seal base portion 287 and the seal bushing 288. The seal base portion 287 is defined integrally with the bearing opposing portion 281, and the seal bushing 288 is fixed to the inner circumferential surface of the seal base portion 287. The seal bushing 288 being defined by a member separate front the seal base portion 287 as described above makes it possible to shape the seal bushing 288 with high accuracy. This in turn makes it possible to define the seal gap 47 between the seal bushing 288 and the bearing portion 23 with, high accuracy. In particular, in the case where the seal bushing 288 is made of a metal, it is possible to shape the seal bushing 288 with higher accuracy, making it possible to define the seal gap 47 with higher accuracy.

The seal bushing 288 includes the flange opposing portion 288a. As a result of the seal bushing 288 being fixed to the seal base portion 287, the coming-off preventing portion 234 is defined with the flange opposing portion 288a being arranged opposite to the flange portion 233 of the bearing portion 23. This contributes to preventing an undercut from occurring in a structure concerning coming-off prevention when the cup 28 is molded. This facilitates manufacture of the bearing mechanism 4.

The seal bushing 288 further includes the seal bushing upper portion 288b arranged to extend upward from the flange opposing portion 288a, and the outer circumferential surface of the seal bushing upper portion 288b is fixed to the inner circumferential surface of the seal base portion 287. This contributes to increasing the length of an area over which the seal bushing 288 is press fitted to the seal base portion 287 when the seal bushing 288 is press fitted to the seal base portion 287. This enables the seal bushing 288 to be securely fixed to the seal base portion 287. Moreover, in the case where the seal bushing 288 is adhered to the seal base portion 287, an increase in an area over which the seal bushing 288 is adhered to the seal base portion 287 is achieved. This enables the seal bushing 288 to be securely fixed to the seal base portion 287.

As described above, the lower end surface 285a of the shaft holding portion 285 is arranged at a level lower than that of the upper end of the stator 210. This contributes to reducing the thickness of each of the motor portion 2 and the blower fan 1 while securing a sufficient length of the area over which the shaft holding portion 285 and the shaft 25 are fastened to each other. The upper end of the stator 210 is arranged at a level higher than that of the upper surface 231a of the sleeve 231, while the lower end of the stator 210 is arranged at a level lower than that of the lower surface of the sleeve 231. The stator 210 is thus prevented from being located too low in the vertical direction. This enables the rotating portion 22 to rotate stably. Moreover, since an increase in the vertical dimension of the cylindrical magnet holding portion 284 is reduced, a reduction in the weight of the rotating portion 22 is achieved. This results in a reduction in the power consumption of the blower fan 1.

Figure 6:
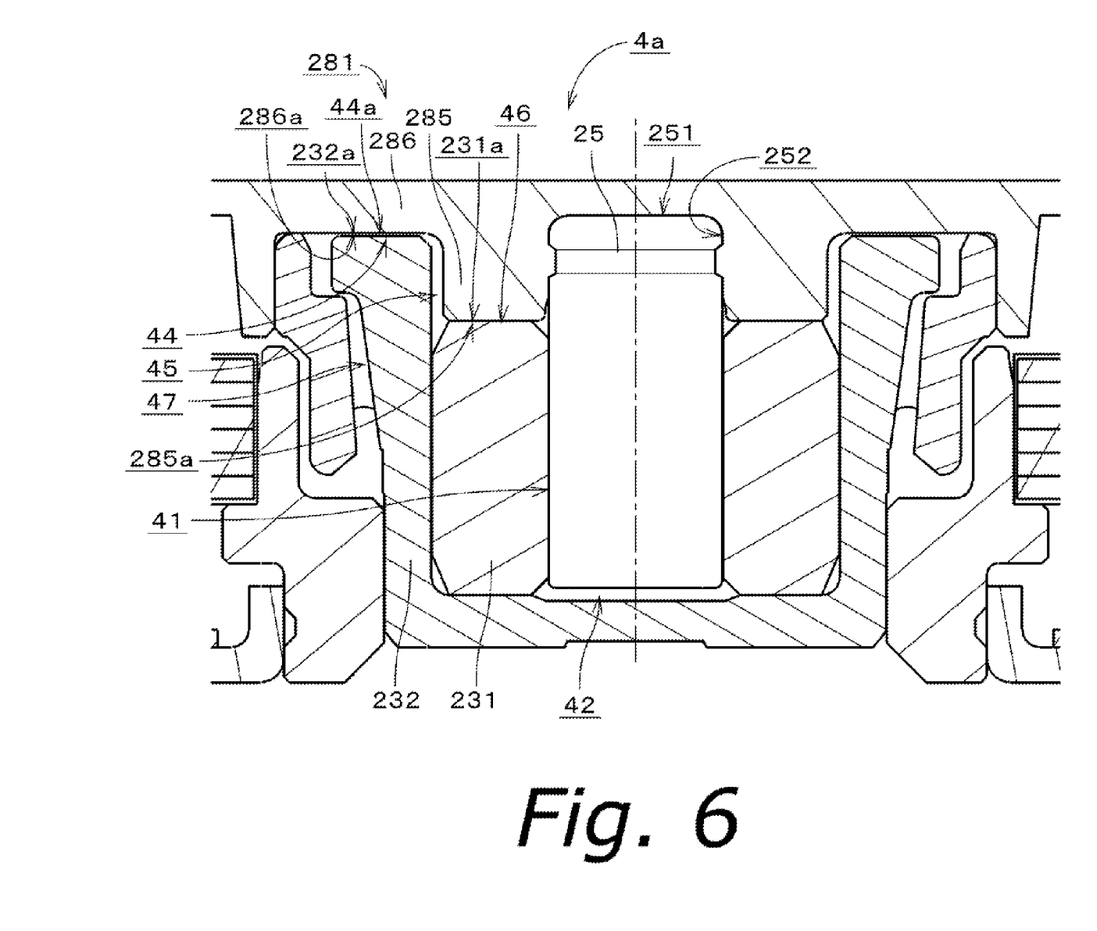
FIG. 6 is a diagram, illustrating a bearing mechanism according to a modification of the first preferred embodiment.

FIG. 6 is a diagram illustrating a bearing mechanism 4a of a blower fan 1 according to a modification of the first, preferred embodiment. In the bearing mechanism 4a illustrated in FIG. 6, a thrust dynamic pressure groove array substantially similar to the thrust dynamic-pressure groove array 273 illustrated in FIG. 4 is defined in an upper surface 232a of a bearing housing 232 or a lower surface 286a of an annular portion 286. A thrust gap 44 is defined between the upper surface 232a of the bearing housing 232 and the lower surface 286a of the annular portion 286. The thrust gap 44 is arranged to define a thrust dynamic pressure bearing portion 44a to generate a fluid dynamic pressure in a lubricating oil. A bearing opposing portion 281 is axially supported by the thrust dynamic pressure bearing portion 44a. A seal gap 47 is arranged to extend downward from an outer circumferential edge of the thrust gap 44. An upper vertical gap 45 is arranged to extend downward from an inner circumferential edge of the thrust gap 44.

An upper horizontal gap 46 extending radially is defined between, an upper surface 231a of a sleeve 231 and a lower end surface 285a of a shaft, holding portion 285. An outer circumferential edge of the upper horizontal gap 46 is arranged to be continuous with a lower end portion of the upper vertical gap 45. An inner circumferential edge of the upper horizontal gap 46 is arranged to be continuous with an upper end portion of a radial gap 41.

In the bearing mechanism 4a, the seal gap 47, the thrust gap 44, the upper vertical gap 45, the upper horizontal gap 46, the radial gap 41, and a lower gap 42 are arranged to together define a single continuous bladder structure, and the lubricating oil is arranged continuously in this bladder structure. Within the bladder structure, a surface of the lubricating oil is defined only in the seal gap 47. The bladder structure contributes to easily preventing a leakage of the lubricating oil.

In the bearing mechanism 4a, as well as in the bearing mechanism 4, the bearing opposing portion 281 is arranged to hold an upper end portion, of a shaft 25 while covering an outer circumferential surface upper portion 252 and an upper end surface 251 of the shaft 25. The lubricating oil is thereby prevented from leaking above the bearing mechanism 4a. In addition, the bearing opposing portion 281 includes the shaft holding portion 285 and the annular portion 286, and the lower end surface 285a of the shaft holding portion 285 is arranged at a level lower than that, of the lower surface 286a of the annular portion 286. This contributes to reducing the vertical thickness of the annular portion 286 while securing a sufficient length of an area over which the shaft, holding portion 285 and the shaft 25 are fastened to each other.

Figure 7:
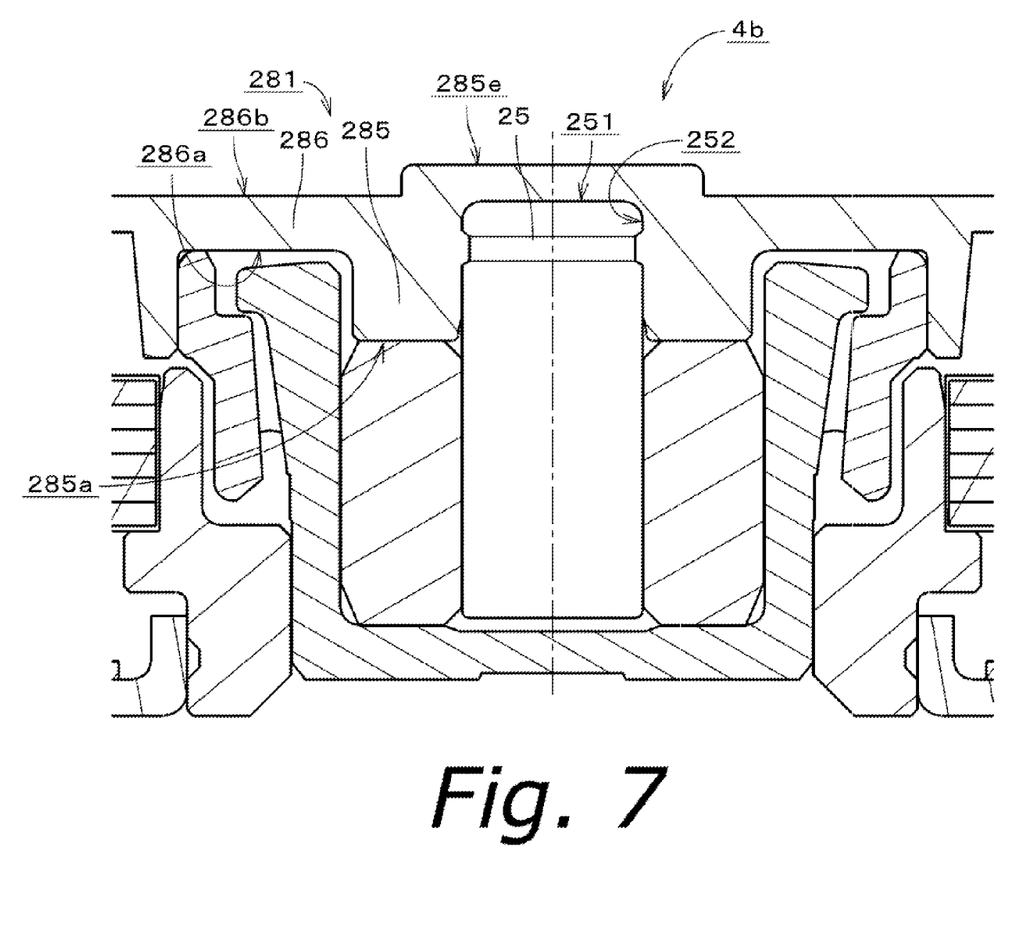
FIG. 7 is a diagram illustrating a bearing mechanism according to a modification of the first, preferred embodiment.

FIG. 7 is a diagram illustrating a bearing mechanism 4b of a blower fan 1 according to another modification of the first preferred embodiment. In the bearing mechanism 4b illustrated in FIG. 7, a central portion (hereinafter referred to as an "upper surface portion 285e") of an upper surface of a shaft holding portion 285 is arranged at a level higher than that of a surrounding portion of the upper surface of the shaft holding portion 285. Moreover, the upper surface portion 285e is arranged at a level higher than that of an upper surface 286b of an annular portion 286. In other words, the upper surface portion 285e is arranged to project upward in an upper surface of a bearing opposing portion 261.

In the bearing mechanism 4b, as well as in the bearing mechanism 4, the shaft holding portion 285 is arranged to hold an upper end portion of a shaft 25 while covering an outer circumferential surface upper portion 252 and an upper end surface 251 of the shaft 25. A lubricating oil is thereby prevented from leaking above the bearing mechanism 4b. In addition, the bearing opposing portion 281 includes the shaft holding portion 285 and the annular portion 286, and a lower end surface 285a of the shaft holding portion 285 is arranged at a level lower than that, of a lower surface 286a of the annular portion 286. This contributes to reducing the vertical thickness of the annular portion 286 while securing a sufficient length of an area over which the shaft holding portion 285 and the shaft 25 are fastened to each other.

Furthermore, in the bearing mechanism 4b, the upper surface portion 285e of the shaft holding portion 285 is arranged at a level higher than that of the upper surface 286b of the annular portion 286. This makes it possible to increase the length of the area over which the shaft holding portion 285 and the shaft 25 are fastened to each other without changing the vertical position of the lower end surface 285a of the shaft holding portion 285. This in turn makes it possible to increase the strength with which the shaft holding portion 285 and the shaft 25 are fastened to each other without increasing the vertical thickness of the blower fan 1 as a whole. In the blower fan 1, an air inlet. 34 (see FIG. 1) is open above the bearing opposing portion 281, and therefore, upward projection of the upper surface portion 285e does not require an increase in the height of a housing 3. Therefore, the upper surface portion 285e does not prevent, a reduction in the thickness of the blower fan 1.

Figure 8:
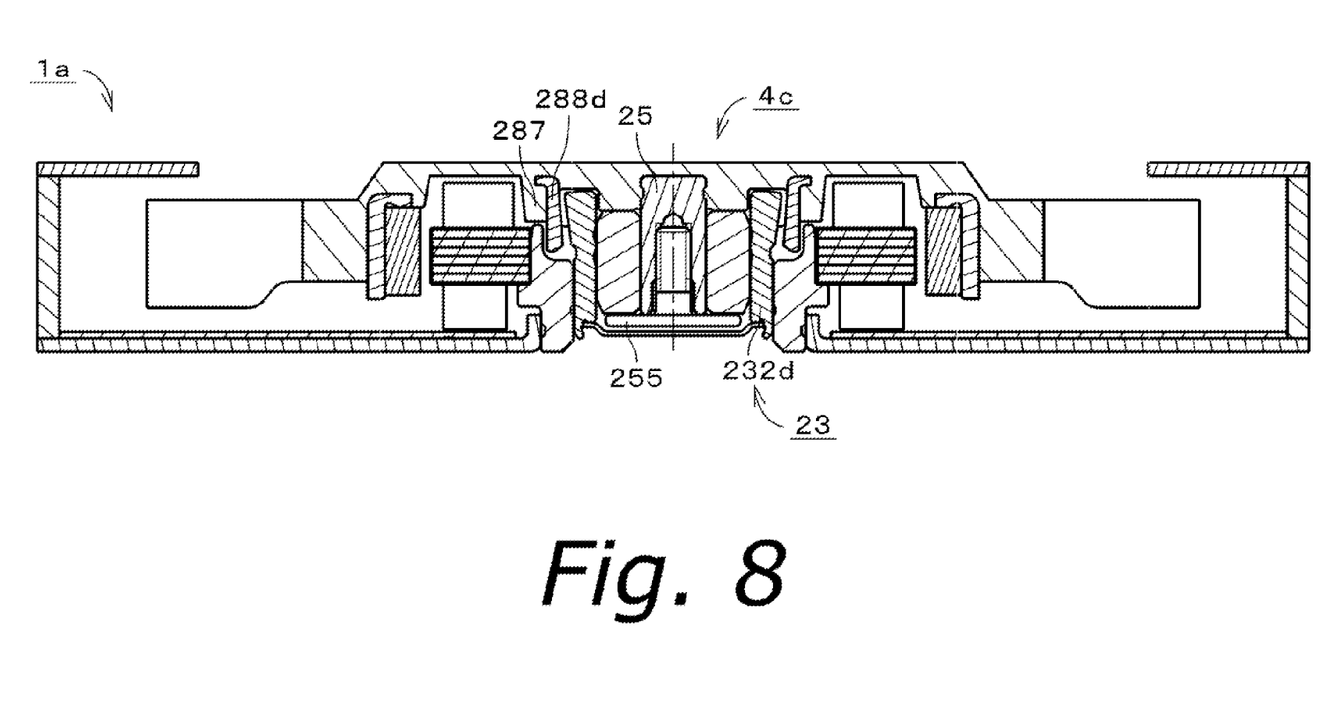
FIG. 8 is a cross-sectional view of a blower fan according to a second preferred embodiment of the present invention.

FIG. 8 is a cross-sectional view of a blower fan 1a according to a second preferred embodiment of the present, invention. In a bearing mechanism 4c of the blower fan 1a, a thrust plate 255 is arranged on a lower end portion of a shaft 25. In addition, a seal bushing 288d, which is different in shape from the seal bushing 288 illustrated in FIG. 2, is fixed radially inside a seal base portion 287. A bearing housing 232d, which, is different in structure from the bearing housing 232 illustrated in FIG. 2, is provided in a bearing portion 23. The blower fan 1a is otherwise substantially similar in structure to the blower fan 1 illustrated in FIG. 1. Accordingly, like members or portions are designated by like reference numerals.

Figure 9:
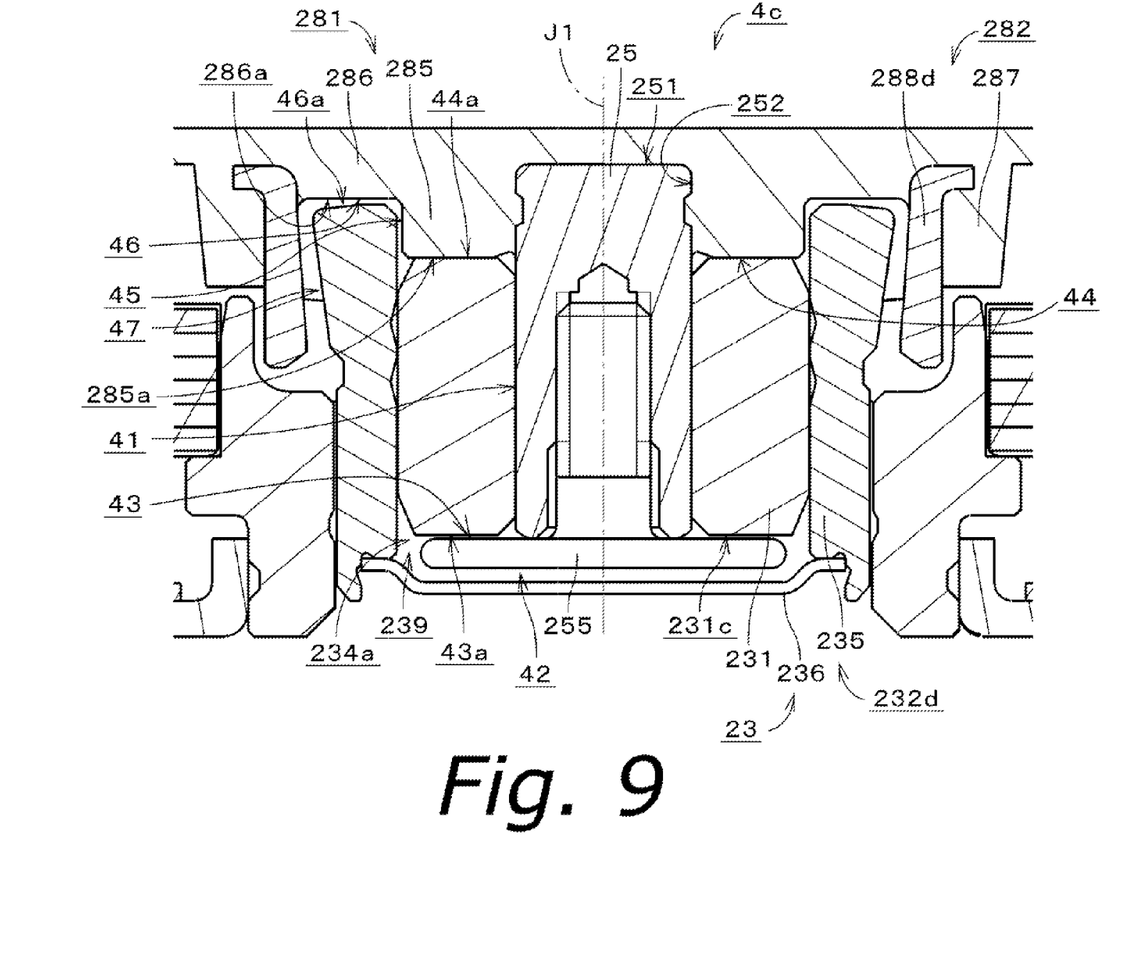
FIG. 9 is a cross-sectional view of a bearing portion and its vicinity according to the second preferred embodiment.

FIG. 9 is a cross-sectional view of the bearing portion 23 of the blower fan 1a and its vicinity. The bearing housing 232d has a bottom and is substantially cylindrical, and is made up of a housing cylindrical portion 235 and a cap 236. The housing cylindrical portion 235 is substantially cylindrical and centered on a central axis J1, and is arranged to cover an outer circumferential surface of a sleeve 231. The sleeve 231 is fixed to an inner circumferential surface of the housing cylindrical portion 235 through an adhesive. The bearing housing 232d is preferably made of a metal. The cap 236 is substantially in the shape of a disk and centered on the central axis J1. The cap 236 is fixed to a lower end portion of the housing cylindrical portion 235. The cap 236 is arranged to close a lower portion of the housing cylindrical portion 235. Note that the sleeve 231 may foe fixed to the inner circumferential surface of the housing cylindrical portion 235 without using the adhesive, and may be fixed to the inner circumferential surface of the housing cylindrical portion 235 through press fit, for example.

The thrust plate 255 includes a substantially disk-shaped portion arranged to extend radially outward. The thrust plate 255 is fixed to the lower end portion of the shaft 25, and is arranged to extend radially outward from the lower end portion of the shaft 25. The thrust plate 255 is accommodated in a plate accommodating portion 239 defined by a lower surface 231c of the sleeve 231, an upper surface of the cap 236, and a lower portion of the inner circumferential surface of the housing cylindrical portion 235. An upper surface of the thrust plate 255 is a substantially annular surface arranged around the shaft 25. The upper surface of the thrust plate 255 is arranged opposite to the lower surface 231c of the sleeve 231, that is, a downward facing surface in the plate accommodating portion 239, in the vertical direction. The thrust plate 255 and the sleeve 231 are arranged to together define a coming-off preventing portion 234a. A lower surface of the thrust plate 255 is arranged opposite to the upper surface of the cap 236 in the vertical direction.

A thrust dynamic pressure groove array substantially similar to the thrust dynamic pressure groove array 273 illustrated in FIG. 4 is defined in the lower surface 231c of the sleeve 231. Mote that this thrust dynamic pressure groove array may be defined in the upper surface of the thrust plate 255. A lower thrust, gap 43 is defined between the lower surface 231c of the sleeve 231 and the upper surface of the thrust plate 255. A lubricating oil is arranged in the lower thrust gap 43. The lower thrust gap 43 is arranged to define a lower thrust dynamic pressure bearing portion 43a to generate a fluid dynamic pressure in the lubricating oil. A bearing opposing portion 281 is axially supported by the lower thrust dynamic pressure bearing portion 43a and a thrust dynamic pressure bearing portion 44a above the sleeve 231. Provision of the thrust dynamic pressure bearing portion 44a and the lower thrust dynamic pressure bearing portion 43a contributes to reducing a variation in vertical play of the shaft 25. The thrust dynamic pressure bearing portion 44a and the lower thrust dynamic pressure bearing portion 43a are arranged to be in communication with each other through a circulation groove extending in the vertical direction. A lower gap 42 is defined between the upper surface of the cap 236 and the lower surface of the thrust plate 255.

The seal bushing 288d is substantially cylindrical and centered on the central axis J1, and is defined by a member separate from the seal base portion 287. The seal bushing 288d is preferably made of a metal. The seal bushing 288d is fixed to an inner circumferential surface of the seal base portion 287 by an insert molding process. A seal gap 47 is defined between an inner circumferential surface of the seal bushing 288d and an outer circumferential surface of the housing cylindrical portion 235 of the bearing housing 232d.

In the bearing mechanism 4c, the seal gap 47, an upper vertical gap 45, an upper horizontal gap 46, a thrust gap 44, a radial gap 41, the lower thrust gap 43, and the lower gap 42 are arranged to together define a single continuous bladder structure, and the lubricating oil is arranged continuously in the bladder structure. Within the bladder structure, a surface of the lubricating oil is defined only in the seal gap 47. The bladder structure contributes to easily preventing a leakage of the lubricating oil. The bearing mechanism 4c includes the bearing portion 23, the shaft 25, the thrust plate 255, the bearing opposing portion 281, a cylindrical seal portion 282, and the lubricating oil.

In the bearing mechanism 4c, as well as in the bearing mechanism 4, a shaft holding portion 285 is arranged to hold an upper end portion of the shaft 25 while covering an outer circumferential surface upper portion 252 and an upper end surface 251 of the shaft 25. The lubricating oil is thereby prevented from leaking above the bearing mechanism 4c. Moreover, the bearing opposing portion 281 includes the shaft holding portion 285 and an annular portion 286, and a lower end surface 285a of the shaft holding portion 285 is arranged at a level lower than that of a lower surface 286a of the annular portion 286. This contributes to reducing the vertical thickness of the annular portion 286 while securing a sufficient, length of an area over which the shaft holding portion 285 and the shaft 25 are fastened to each other.

Each of the blower fans 1 and 1a may be modified in a variety of manners.

Note that the bearing opposing portion 281 may not necessarily be shaped such that the shaft holding portion 285 projects downward from the annular portion 286. For example, an entire portion of the lower surface of the bearing opposing portion 281, excluding a portion thereof which is in contact with the upper end surface 251 of the shaft 25, may be arranged at the same vertical position. In this case, the upper surface 231a of the sleeve 231 and the upper surface 232a of the bearing housing 232 are arranged at substantially the same vertical position.

Note that the thrust dynamic pressure bearing portion may not necessarily be defined in a gap between the lower surface of the bearing opposing portion 281 and an upper surface of the bearing portion 23 as long as the lubricating oil is arranged in the gap. For example, in the case where the thrust plate 255 is arranged on a lower end of the shaft 25 as in the bearing mechanism 4c illustrated in FIG. 9, the thrust dynamic pressure bearing portion may be defined only in the lower thrust gap 43 defined between the lower surface 231c of the sleeve 231 and the upper surface of the thrust plate 255.

Note that the cylindrical seal portion 282 may not necessarily foe structured to include the seal base portion 287 and the seal bushing 288. For example, the entire cylindrical seal portion 282 may be defined integrally with the bearing opposing portion 281.

Also note that, in the stationary portion 21, both the stator 210 and the bearing portion 23 may be directly fixed to the lower plate portion 32 without the stationary portion 21 including the bushing 24.

Also note that each of the bearing mechanisms 4 and 4a to 4c may be used in a variety of motors other than the motor portion 2. Also note that the structure of the motor portion 2 may be applied to a variety of motors other than the motor portions of the blower fans 1 and 1a.

Features of the above-described preferred embodiments and the modifications thereof may be combined appropriately as long as no conflict, arises.

Centrifugal fans according to preferred embodiments of the present invention are usable to cool devices inside cases of notebook PCs and desktop PCs, to cool other devices, to supply an air to a variety of objects, and so on. Moreover, centrifugal fans according to preferred embodiments of the present, invention are usable for other purposes as well.

What is claimed is:

1. A bearing apparatus comprising:
   a bearing portion having a bottom and being substantially cylindrical;
   a shaft inserted in the bearing portion, and arranged to rotate about a central axis relative to the bearing portion;
   a bearing opposing portion defined in one piece, arranged above the bearing portion, and arranged to hold an upper end portion of the shaft while covering an outer circumferential surface upper portion and an upper end surface of the shaft; and
   a cylindrical seal portion arranged to extend downward from the bearing opposing portion; wherein
   an inner circumferential surface of the cylindrical seal portion and an outer circumferential surface of the bearing portion are arranged to together define a seal gap therebetween, the seal gap including a seal portion having a surface of a lubricating oil defined therein;
   an inner circumferential surface of the bearing portion and an outer circumferential surface of the shaft are arranged to together define a radial gap therebetween, the radial gap including a radial dynamic pressure bearing portion arranged to radially support the shaft; and
   the lubricating oil is arranged in a gap defined between a lower surface of the bearing opposing portion and an upper surface of the bearing portion,
   the cylindrical seal portion includes:
      a cylindrical seal base portion defined integrally with the bearing opposing portion, and arranged to extend downward from the bearing opposing portion; and
      a cylindrical seal bushing fixed to an inner circumferential surface of the seal base portion; and
   the seal gap is defined between an inner circumferential surface of the seal bushing and the outer circumferential surface of the bearing portion.

2. The bearing apparatus according to claim 1, wherein the bearing opposing portion includes:
   a shaft holding portion in a shape of a covered cylinder and arranged to be in contact with the outer circumferential surface upper portion and the upper end surface of the shaft; and
   an annular portion arranged to extend radially outward from the shaft holding portion;
   the cylindrical seal portion is arranged to extend downward from the annular portion; and
   a lower end surface of the shaft holding portion is arranged at a level lower than that of a lower surface of the annular portion.

3. The bearing apparatus according to claim 2, wherein the bearing portion includes:
   a cylindrical inner circumferential bearing portion arranged to surround the shaft from radially outside, and arranged opposite to the lower end surface of the shaft holding portion in a vertical direction; and
   a cylindrical outer circumferential bearing portion arranged radially outside the inner circumferential bearing portion, and arranged opposite to the lower surface of the annular portion in the vertical direction;
   an upper surface of the inner circumferential bearing portion is arranged at a level lower than that of an upper surface of the outer circumferential bearing portion; and
   the lower end surface of the shaft holding portion is arranged between the upper surface of the inner circumferential bearing portion and the upper surface of the outer circumferential bearing portion in the vertical direction.

4. The bearing apparatus according to claim 3, wherein the lower end surface of the shaft holding portion and the upper surface of the inner circumferential bearing portion are arranged to together define a gap therebetween, the gap including a thrust dynamic pressure bearing portion arranged to axially support the bearing opposing portion.

5. The bearing apparatus according to claim 3, wherein the lower surface of the annular portion and the upper surface of the outer circumferential bearing portion are arranged to together define a gap therebetween, the gap including a thrust dynamic pressure bearing portion arranged to axially support the bearing opposing portion.

6. The bearing apparatus according to claim 3, wherein
   the inner circumferential bearing portion is a sleeve; and
   the outer circumferential bearing portion is a bearing housing arranged to cover an outer circumferential surface and a lower surface of the sleeve.

7. The bearing apparatus according to claim 2, wherein the shaft holding portion includes an upper surface portion arranged to cover the upper end surface of the shaft, and arranged at a level higher than that of an upper surface of the annular portion.

8. The bearing apparatus according to claim 1, wherein the bearing opposing portion includes an inner circumferential surface arranged to be in contact with the outer circumferential surface upper portion of the shaft and including a recessed portion or a raised portion, while the outer circumferential surface upper portion of the shaft includes a recessed portion arranged to be fitted to the raised portion of a shaft holding portion of the bearing opposing portion.

9. The bearing apparatus according to claim 8, wherein the recessed portion or the raised portion is arranged on an upper side of a vertical middle of the inner circumferential surface of the bearing opposing portion.

10. The bearing apparatus according to claim 1, wherein the bearing portion includes:
    a sleeve; and
    a bearing housing arranged to cover an outer circumferential surface and a lower surface of the sleeve.

11. The bearing apparatus according to claim 1, wherein the bearing portion includes a flange portion arranged to project radially outward toward the cylindrical seal portion; and the seal bushing includes a flange opposing portion arranged below the flange portion and opposite to the flange portion in a vertical direction to define a coming-off preventing portion.

12. The bearing apparatus according to claim 11, wherein the seal bushing is fixed to the inner circumferential surface of the seal base portion by being press fitted radially inside the seal base portion; and
the seal bushing further includes a seal bushing upper portion arranged to extend upward from the flange opposing portion, and fixed to the inner circumferential surface of the seal base portion.

13. A motor comprising:
a stationary portion;
the bearing apparatus of claim 1; and
a rotating portion supported by the bearing apparatus to be rotatable with respect to the stationary portion; wherein
the stationary portion includes:
  a stator; and
  a base portion to which both the stator and the bearing portion of the bearing apparatus are directly or indirectly fixed; and
the rotating portion includes:
  a cover portion arranged to extend radially outward from the bearing opposing portion;
  a cylindrical magnet holding portion arranged to extend downward from the cover portion; and
  a rotor magnet fixed to an inner circumferential surface of the cylindrical magnet holding portion, and arranged radially outside the stator.

14. A motor comprising:
a stationary portion;
the bearing apparatus of claim 2; and
a rotating portion supported by the bearing apparatus to be rotatable with respect to the stationary portion; wherein
the stationary portion includes:
  a stator; and
  a base portion to which both the stator and the bearing portion of the bearing apparatus are directly or indirectly fixed;
the rotating portion includes:
  a cover portion arranged to extend radially outward from the bearing opposing portion;
  a cylindrical magnet holding portion arranged to extend downward from the cover portion; and
  a rotor magnet fixed to an inner circumferential surface of the cylindrical magnet holding portion, and arranged radially outside the stator; and
the lower end surface of the shaft holding portion is arranged at a level lower than that of an upper end of the stator.

15. A motor comprising:
a stationary portion;
the bearing apparatus of claim 3; and
a rotating portion supported by the bearing apparatus to be rotatable with respect to the stationary portion; wherein
the stationary portion includes:
  a stator; and
  a base portion to which both the stator and the bearing portion of the bearing apparatus are directly or indirectly fixed;
the rotating portion includes:
  a cover portion arranged to extend radially outward from the bearing opposing portion;
  a cylindrical magnet holding portion arranged to extend downward from the cover portion; and
  a rotor magnet fixed to an inner circumferential surface of the cylindrical magnet holding portion, and arranged radially outside the stator; and
the lower end surface of the shaft holding portion is arranged at a level lower than that of an upper end of the stator.

16. A blower fan comprising:
the motor of claim 13; and
a plurality of blades arranged radially outside the cylindrical magnet holding portion of the motor, and caused by the motor to rotate about the central axis.

17. A blower fan comprising:
the motor of claim 14; and
a plurality of blades arranged radially outside the cylindrical magnet holding portion of the motor, and caused by the motor to rotate about the central axis.

18. A blower fan comprising:
the motor of claim 15; and
a plurality of blades arranged radially outside the cylindrical magnet holding portion of the motor, and caused by the motor to rotate about the central axis.

* * * * *